Figure 5A:
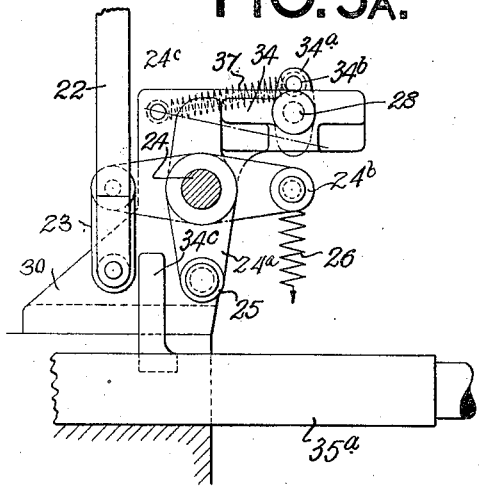

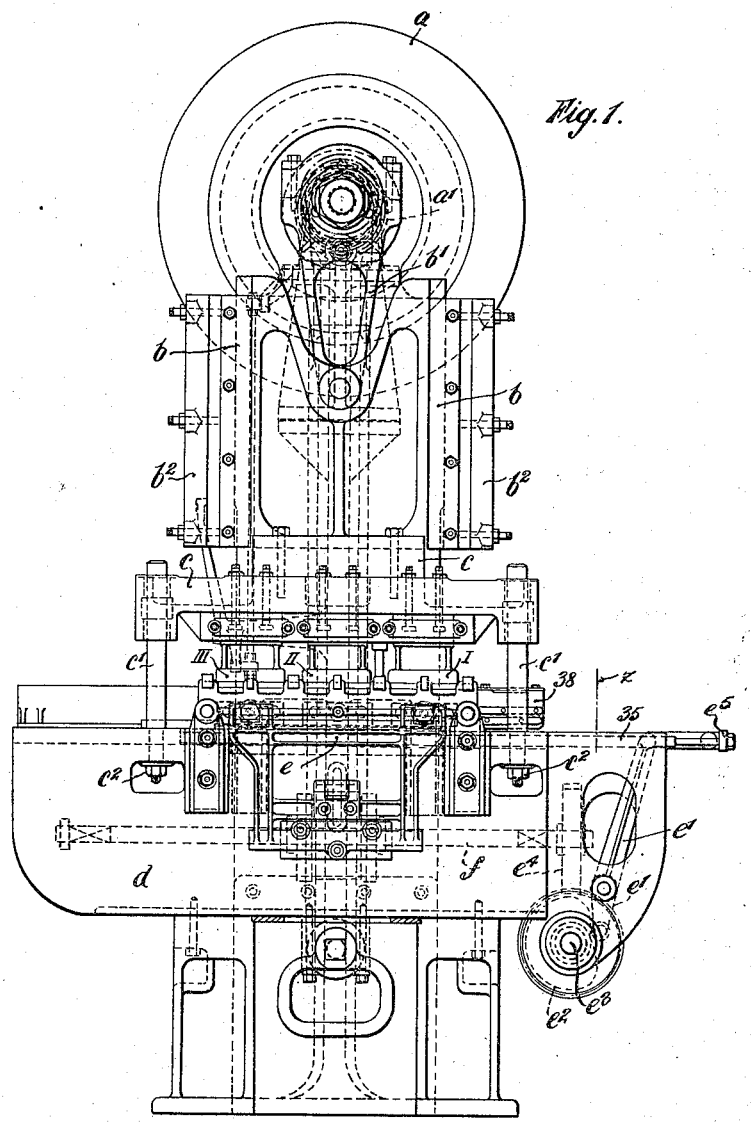

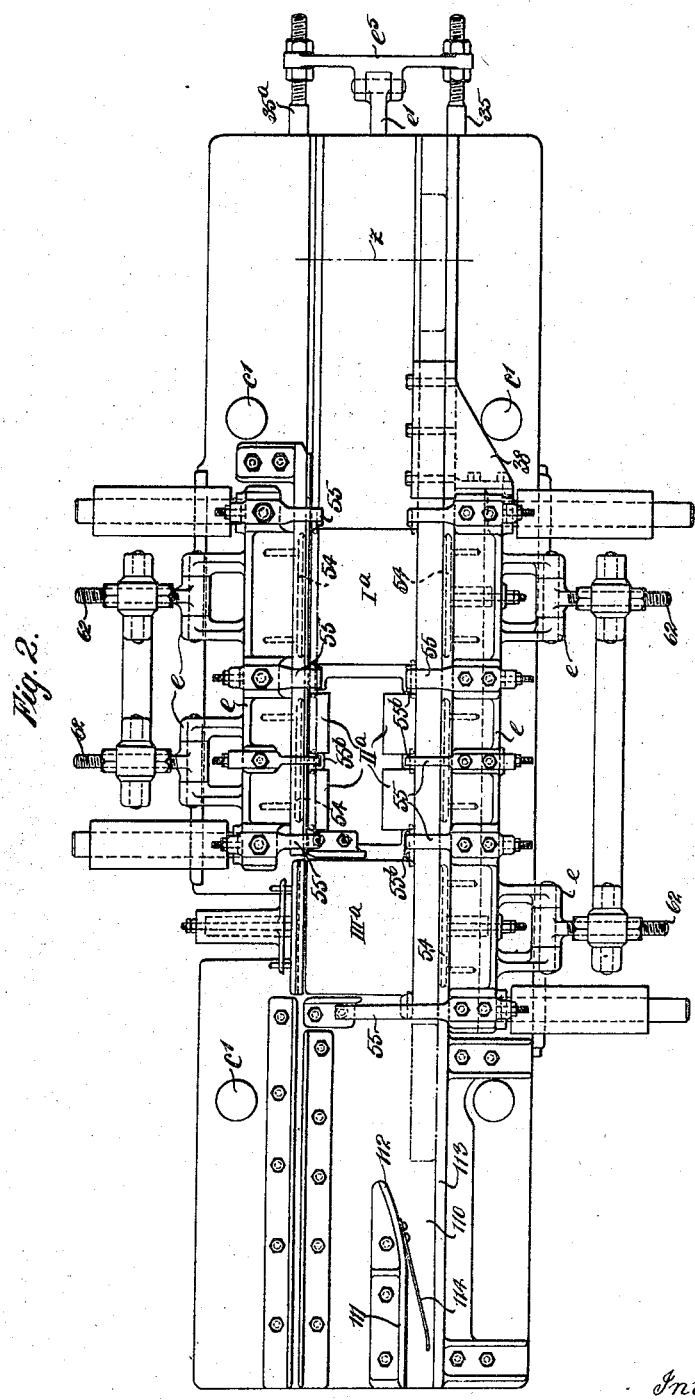

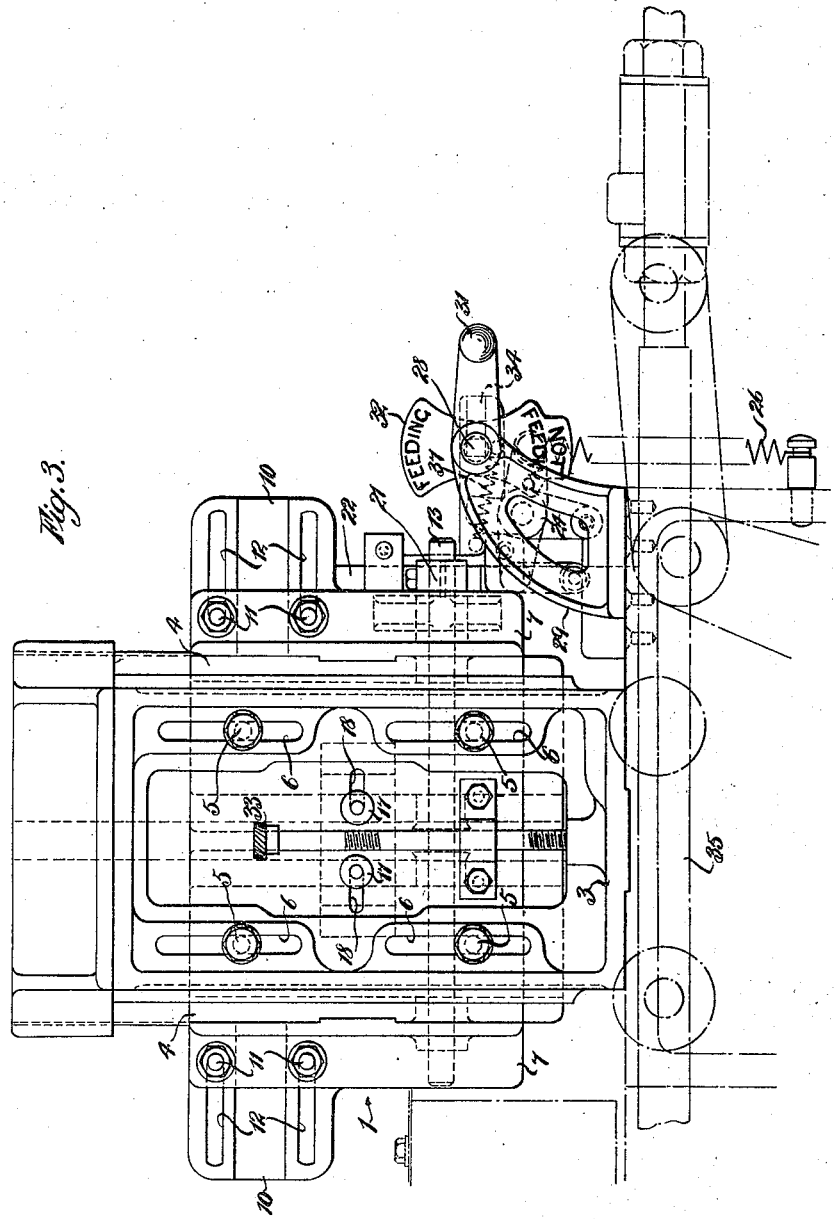

Nov. 11, 1924.  
G. W. BERRY  
1,514,599  
MECHANISM FOR THE PRODUCTION OF SHEET METAL RECEPTACLES  
HAVING A WIRELESS HINGED JOINT BETWEEN THE BODY AND LID  
Filed Jan. 16, 1923 . 12 Sheets-Sheet 4
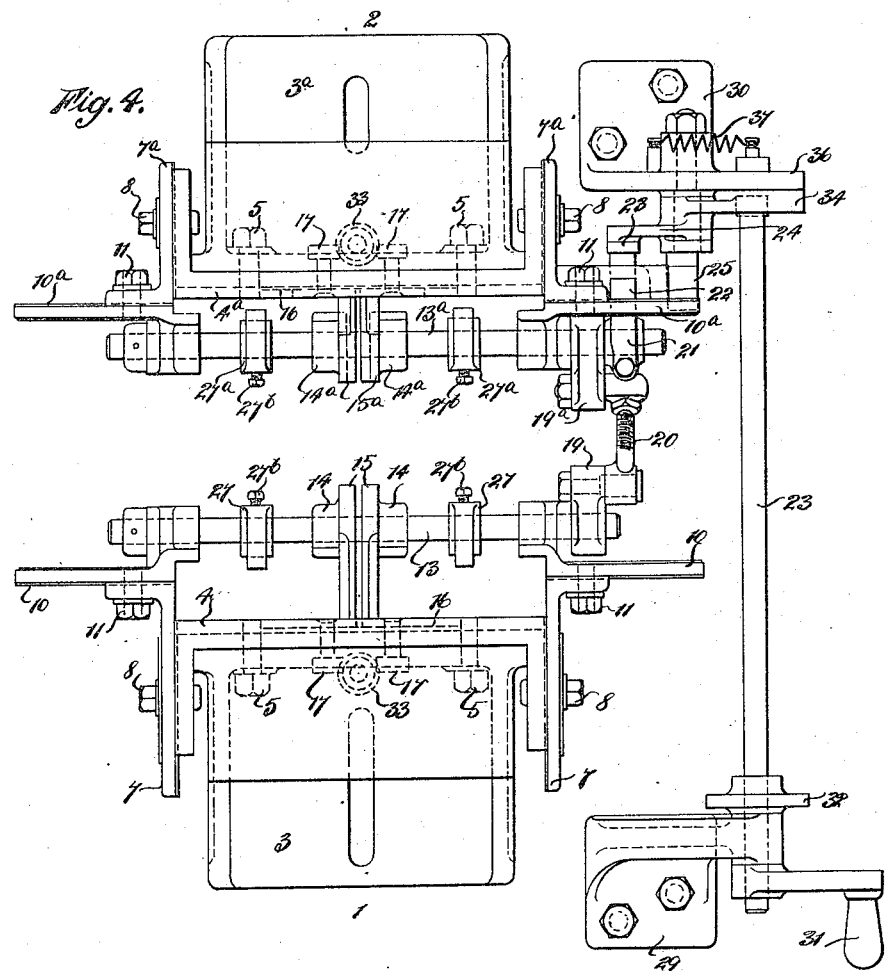
Inventor  
George William Berry  
Attorney

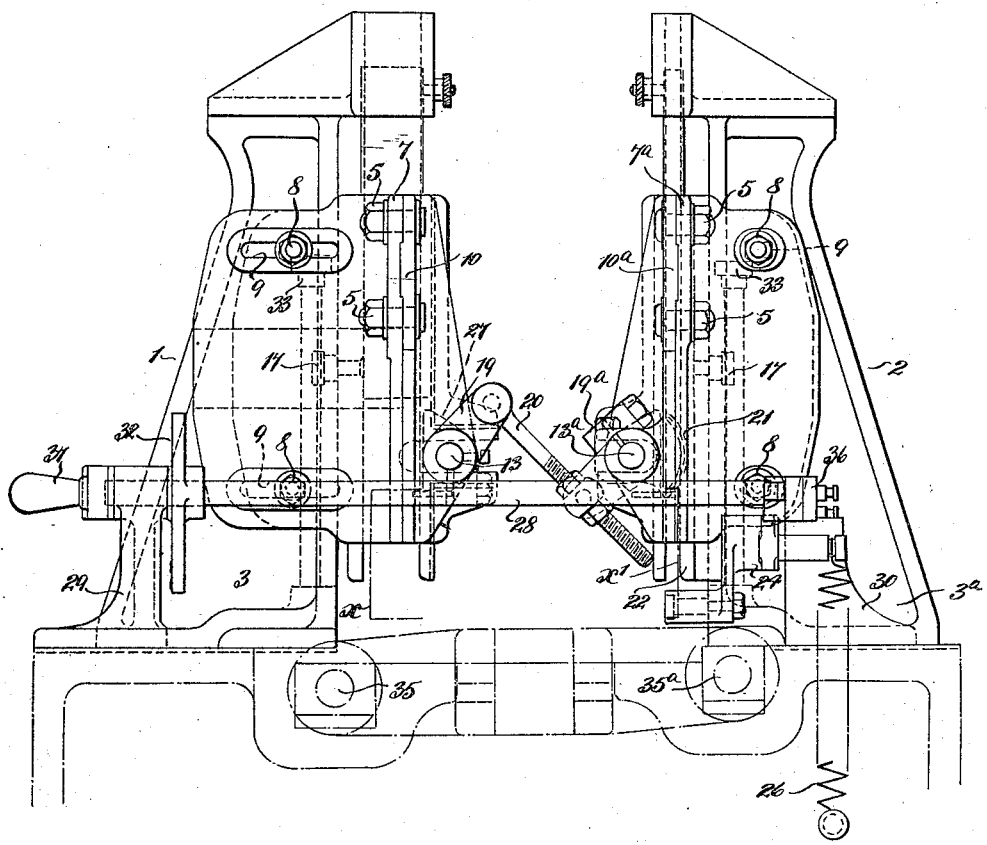

INVENTOR:
George William Berry.
ATTORNEY:

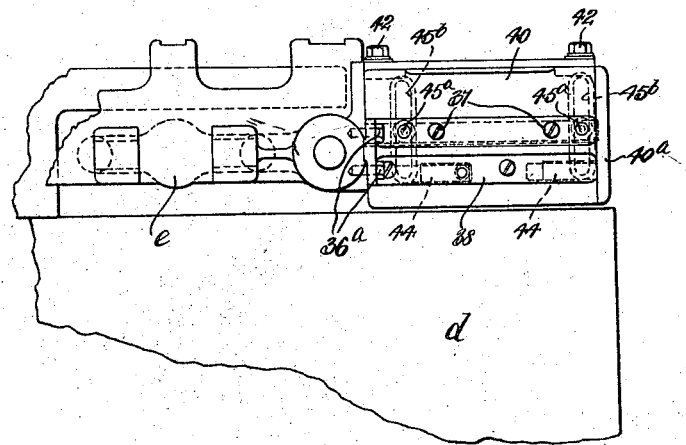
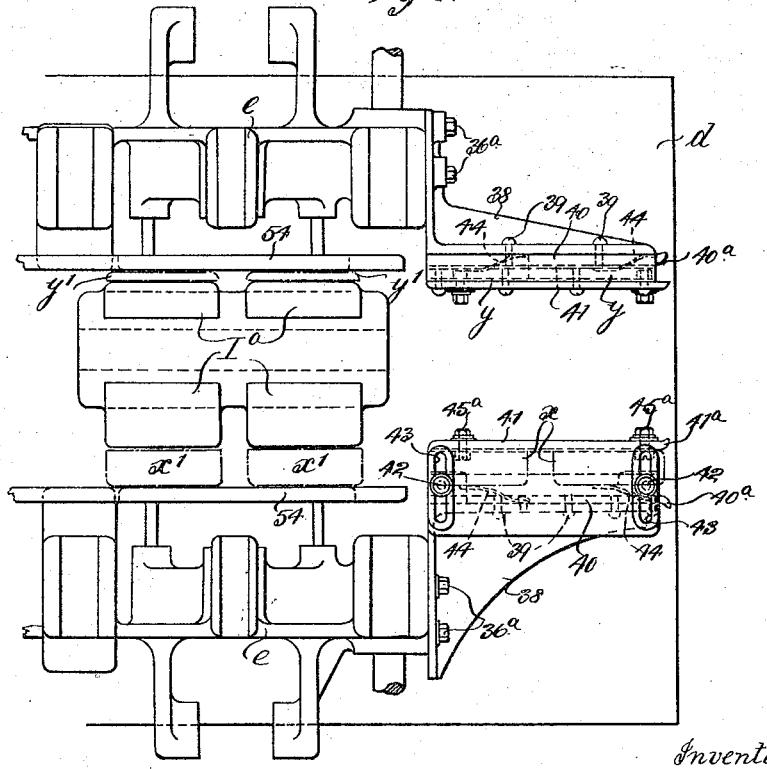

Nov. 11, 1924. 1,514,599
G. W. BERRY
MECHANISM FOR THE PRODUCTION OF SHEET METAL RECEPTACLES
HAVING A WIRELESS HINGED JOINT BETWEEN THE BODY AND LID
Filed Jan. 16, 1923  12 Sheets-Sheet 8

Inventor
George William Berry
Attorney

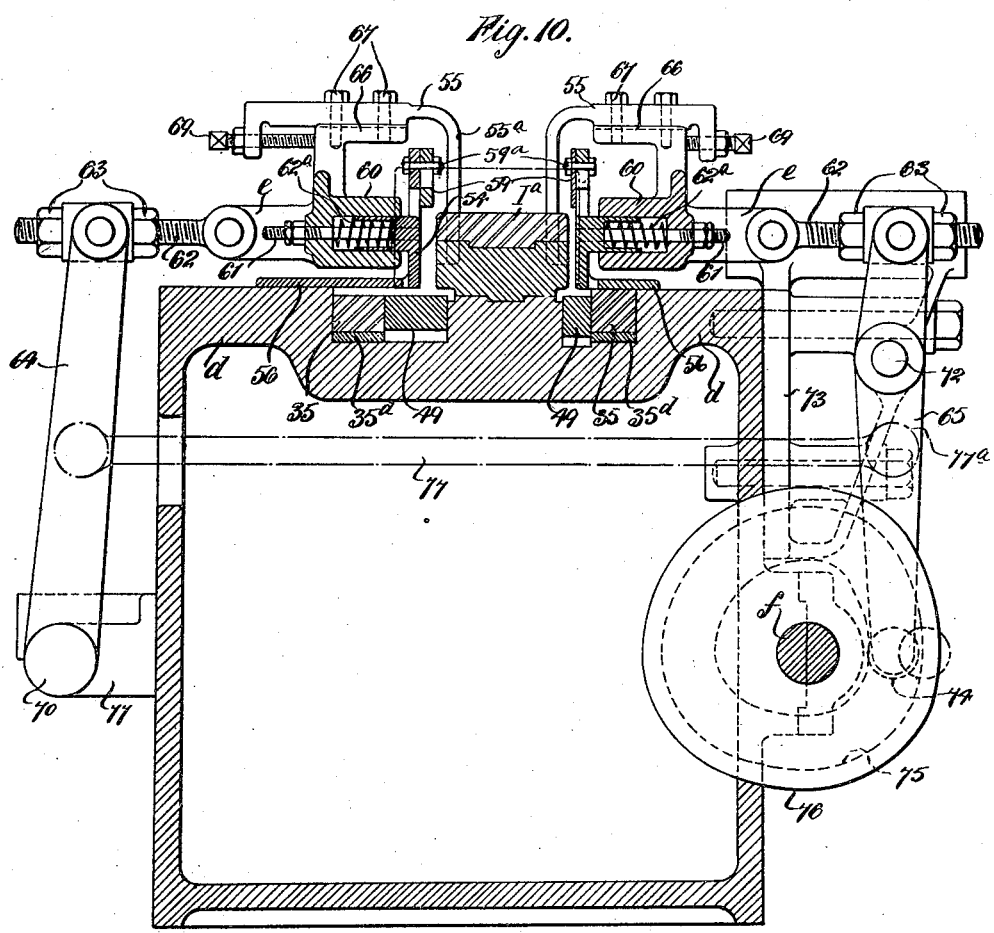

Nov. 11, 1924.  
G. W. BERRY  
1,514,599  
MECHANISM FOR THE PRODUCTION OF SHEET METAL RECEPTACLES  
HAVING A WIRELESS HINGED JOINT BETWEEN THE BODY AND LID  
Filed Jan. 16, 1923 12 Sheets-Sheet 11
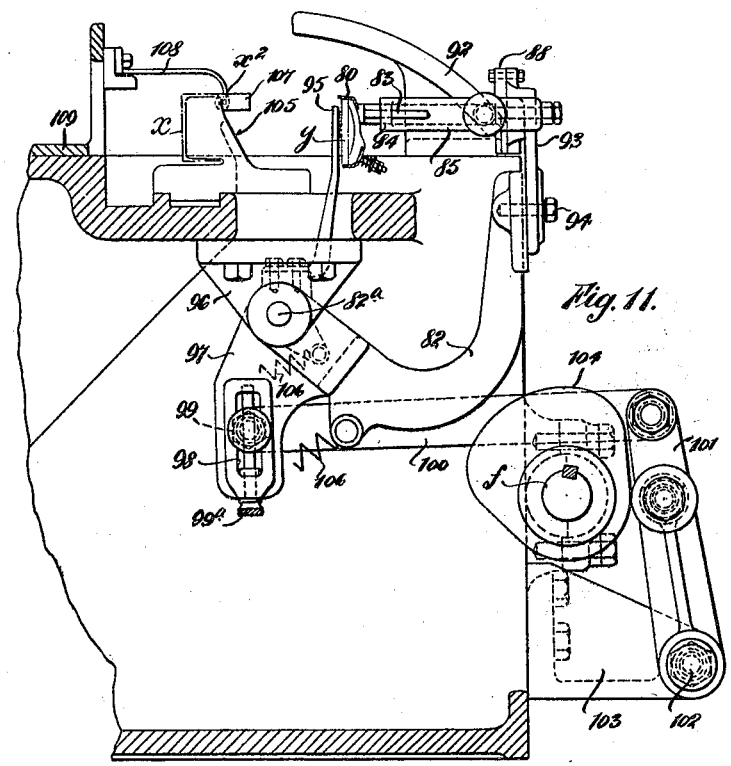
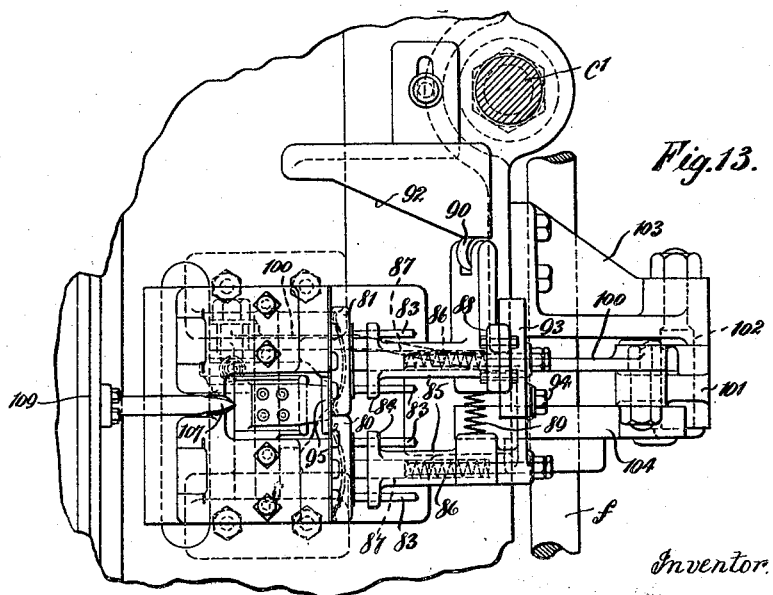
Inventor,
George William Berry.
Attorney Patented Nov. 11, 1924.

1,514,599

UNITED STATES PATENT OFFICE.

GEORGE WILLIAM BERRY, OF WAKEFIELD, ENGLAND, ASSIGNOR TO BERRY HINGE LIMITED, OF LONDON, ENGLAND, A BRITISH COMPANY.

MECHANISM FOR THE PRODUCTION OF SHEET-METAL RECEPTACLES HAVING A WIRELESS HINGED JOINT BETWEEN THE BODY AND LID.

Application filed January 16, 1923. Serial No. 612,879.

*To all whom it may concern:*

Be it known that I, GEORGE WILLIAM BERRY, residing at Wakefield, in the county of York, England, a subject of the King of Great Britain and Ireland, have invented certain new and useful improvements relating to mechanism for the production of sheet-metal receptacles having a wireless hinged joint between the body and lid, of which the following is a specification.

This invention relates to improvements in mechanism for the production of sheet metal receptacles having a wireless hinged joint between the body and lid.

In the specification of prior Letters Patent No. 1311587 there are described methods and mechanism for the manufacture of sheet metal receptacles comprising a body formed with bulbed tongues and a rimmed lid adapted to fit over the body portion formed with integral hinged pintles upon the rim, and over or upon which pintles the bulbed tongues are closed to form a wireless hinged joint uniting said body and lid.

The present invention comprises various improved mechanism for the same purpose as the inventions covered in the aforesaid Letters Patent whereby adjustments may be made to enable more than one complete receptacle to be dealt with or produced at the same time in a single operation and whereby also elements of such machine may be adjusted for dealing with either single receptacle or a plurality thereof of different sizes within certain limits prescribed by the minimum and maximum dimensions of dies insertable into the machine, said limits however being such as to permit the machine to produce receptacles comprising a relatively large range of sizes such as are commonly required in commerce.

The invention also comprises in connection with the adjustability above mentioned novel mechanism for feeding the bodies and lids constituting a receptacle, novel mechanism for adjusting and controlling the operation of the members which feed the bodies and lids to the dies, and the members which place said parts on the dies and after shaping remove them therefrom and novel mechanism for adjusting, positioning and controlling the movements of the lids at the assembling position, all these features providing for dealing with different sized receptacles either when a single one or a plurality is being produced at each operation.

The invention further comprises novel details of construction, arrangement and combinations of parts, all as hereinafter fully described and specifically pointed out in appended claims.

The accompanying drawings show so much of a machine of the type described more particularly in Letters Patent No. 1311587 and separate views of the novel mechanisms referred to as will be sufficient to fully comprehend the invention.

Figure 5B:
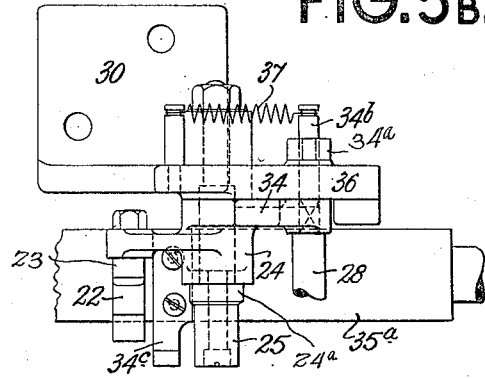
Figure 8:
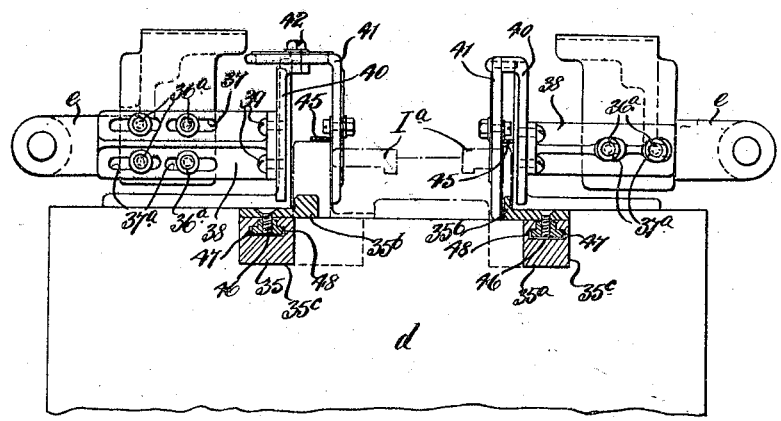
Figure 9:
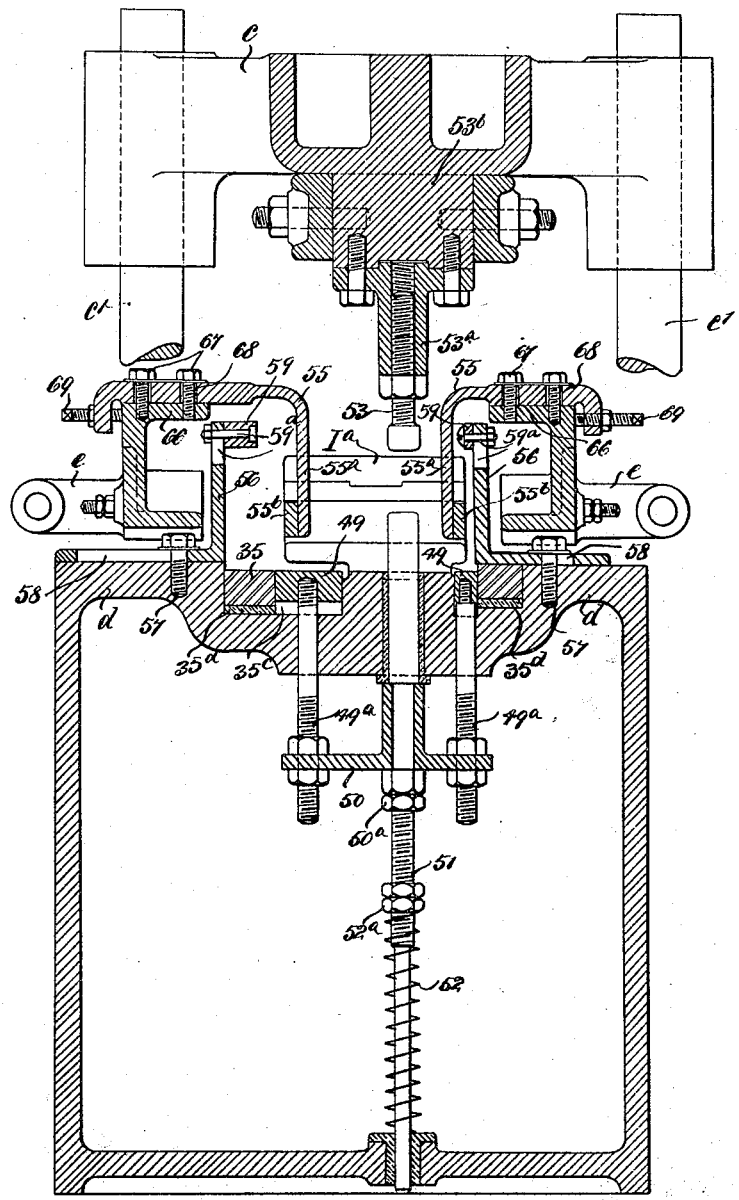
Figure 12:
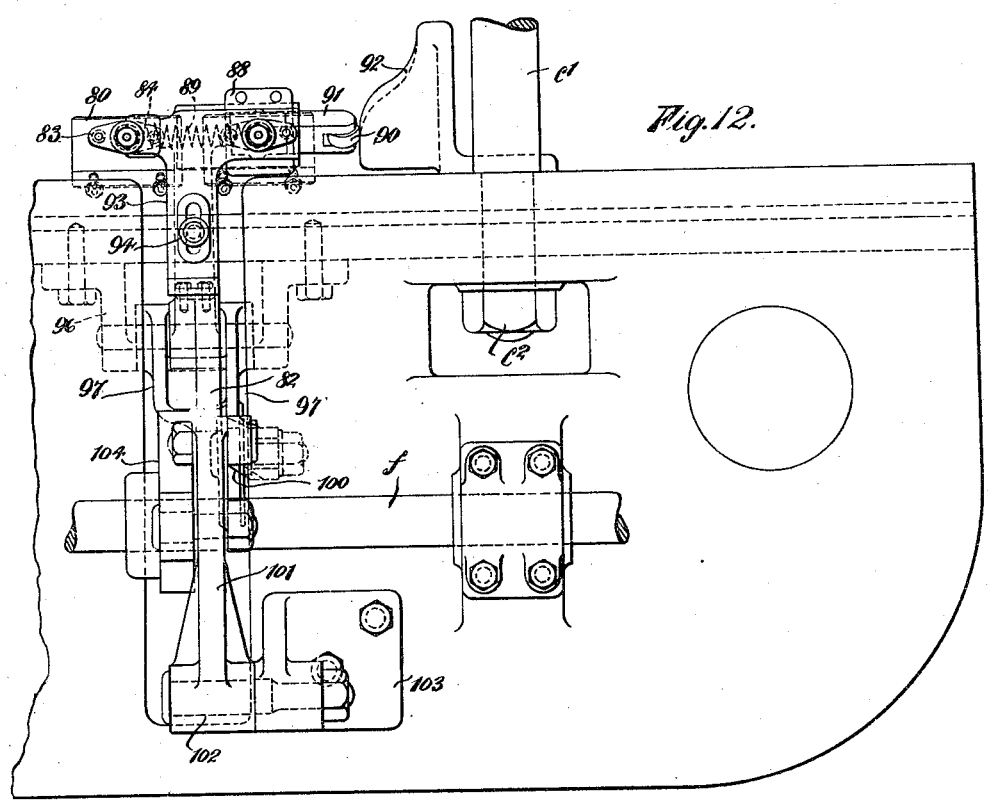

In said drawings, Fig. 1 is a front elevation of the machine with the feeding chutes for the bodies and lids with associated parts removed; Fig. 2 is a plan view of the lower part of the machine, or "sub-press"; Fig. 3 is a side elevation of a feed chute and feed control mechanism; Fig. 4 is a plan view of said feed chutes, and Fig. 5 is an end elevation thereof from the right hand of Figs. 3 and 4. Fig. 5$^a$ is a side elevation and Fig. 5$^b$ a plan view, respectively, on an enlarged scale, of parts illustrated in Figs. 3 to 5. Fig. 6 is a side elevation showing certain "idle-motion" guiding means for the bodies and lids between the feeding chutes and first die position, and showing also push-pads by which the bodies and lids are carried over the lower dies and under the punches, parts of this latter mechanism being omitted for sake of clearness; Fig. 7 is a plan view of Fig. 6; Fig. 8 is an end view from the right of Fig. 6 with parts in section; Fig. 9 is a cross section through the sub-press including also part of the press ram or upper die head, and specifically showing the construction of ejectors for the bodies and lids hereinafter described; Fig. 10 is a cross section through the sub-press showing specifically the construction of the push-pads and their means of operation. Fig. 11 is a partial cross section through the machine showing particularly the lid holders at the assembling position and their means of operation; Fig. 12 is a side elevation from the right of Fig. 11, and Fig. 13 is a plan view of the last mentioned figure.

For the sake of clearness of illustration all the figures of the drawings are not drawn to the same scale, for example Fig. 2 is on a scale enlarged as regards Fig. 1. Figs. 4, 5 and 6 whilst collectively on the same scale are still further enlarged as regards Figs. 1 and 2. Figs. 6, 7 and 8 whilst together on the same scale are enlarged as regards Figs. 1 and 2 but reduced as regards Figs. 4 to 6, and Figs. 9 to 13 are drawn to the same scale as Figs. 6 to 8.

The machine illustrated in the drawings and particularly in Figs. 1 and 2 has many features in common with that described in the specification of Letters Patent No. 1311587 before referred to but the following brief description is given in order to render clear the improvements described later and forming the subject matter of the present invention.

The combined belt pulley and fly wheel $a$ transmits vertical reciprocating motion through crank mechanism $a^1$ to a cross head $b$ connected to crank mechanism by link $b^1$, said cross head sliding vertically in guides $b^2$. The underside of the cross head $b$ is fitted with a die head $c$ working over vertical pillars $c^1$ secured by nuts $c^2$ to the sub-press $d$ and fitted to the underside of the guide head are top punches designated by the characters I, II, III to indicate their order of operation, these punches being designed to co-operate and register with a similar number of lower dies $I^a$, $II^a$, $III^a$ mounted in the bed of the sub-press $d$. In Fig. 2 the central lower dies at position $II^a$ are shown in duplicate for the purpose hereinafter explained. At front and back of the sub-press are provided frames $e$ carrying push pads 54 and ejectors 55 to be described in detail later, the said push pads forcing the bodies and lids to constitute a box or receptacle on to the lower dies and the ejectors removing them from said dies after being operated on by the upper punches I, II, III. These frames are reciprocated simultaneously in a horizontal plane by means to be mentioned later and the bodies and lids are fed successively to positions in front of said pads by means of feed bars or members 35, $35^a$ carrying fingers also described later, these bars being coupled together by a cross frame $e^5$ operated by lever $e^1$ actuated by a cam $e^2$ on a cross shaft $e^3$ which through worm gear $e^4$ drives a cam shaft $f$ at the back of the machine from which the push pads and ejectors together with an assembling throw-over arm hereinafter mentioned are operated.

The above functions apart from the special features of adjustability and provision for dealing with a plurality of receptacle elements are similar to those described in the specification of Letters Patent 1311587 above mentioned.

In Figs. 1 and 2 there has been omitted for sake of clearness any illustration of the feeding means including chutes for conveying the bodies and lids to the feed members 35, $35^a$, but it will be understood that said feeding chutes are mounted on the sub-press $d$ to the right hand side of the die head $c$, the broken line $z$ in said Figs. 1 and 2 designating the centre line of said chutes.

To now describe the novel mechanism just mentioned for feeding the bodies and lids to the members 35, $35^a$ which ultimately convey them between the lower dies and upper punches, reference is directed to Figs. 3 to 5 of the drawings. This mechanism embodies adjustable means for accommodating any ordinary size of receptacle within the limits of the machine, for example, the bodies and lids for forming receptacles up to and including 3½ inches in length are passed through the machine two at a time, while the said members for receptacles exceeding 3½ inches up to 7 inches in length are passed singly through the machine. The machine however could equally well be adapted for dealing simultaneously with more than two receptacles.

In such feed mechanism two oppositely disposed chute structures are provided, one designated 1 for receiving the bodies and the other designated 2, for the lids, said chutes comprising or being formed of main members or castings 3, $3^a$ respectively which are mounted on the sub-press $d$ and are adjustable horizontally in directions converging or diverging to or from one another.

Slidably mounted on said main members 3, $3^a$ are vertical channelled members or guides 4, $4^a$ forming chutes for the bodies and lids respectively and which are adjustably secured to said main members as by studs 5 passing through elongated slots 6. Lateral members 7, $7^a$ are slidably carried on the channelled guides 4, $4^a$ and fixed in position thereon also by studs 8 traversing slots 9, and further, end members 10, $10^a$ are in turn slidably mounted on said lateral members 7, $7^a$ and again secured in position by studs 11 working in slots 12.

Horizontal rock shafts 13, $13^a$ are rotatably mounted at the lower ends of the end members 10, $10^a$ and each of said shafts carries two central guides 14, $14^a$ which are slidably mounted in brackets or arms 15, $15^a$ respectively which in turn are adjustably supported in grooves 16 in the channelled guides 4, $4^a$ and held in position as by screws 17 traversing slots 18. The chutes proper are thus completed and the methods of mounting the parts described permits of them being adjusted for various sizes of bodies and lids. The aforesaid rock shafts 13, $13^a$ also carry levers 19, $19^a$ extending inwardly towards the opposite chute members and connected together at their free ends by an adjustable screw-threaded link 20, whilst a toothed quadrant 21 mounted on the shaft $13^a$ engages a rack 22 vertically movable in the chute structure 2, this rack being connected by a link 23 to a four-armed lever 24 mounted to one side of said chute structure. One arm 24$^a$ of said bell crank lever carries a roller 25 whilst to another arm 24$^b$ thereof is connected one end of a spring 26 the other end of which is anchored to the sub-press $d$.

Within the channelled guides 4, 4$^a$ and in the path of the bodies and lids designated $x$ and $x^1$ respectively in Fig. 5 which pass down same, are located releasing fingers 27, 27$^a$ which are adjustably mounted on the rock-shafts 13, 13$^a$ by means of set-screws 27$^b$ and have upper and lower arms adapted to engage the bodies and lids as hereinafter explained.

Associated with the aforesaid lever 24 is a spindle 28 extending across the machine and mounted in brackets 29, 30 on the sub-press, one of said brackets, viz, 30 also supporting said lever 24 and the spindle being provided at the opposite end with an operating handle 31. An index plate 32 showing indications such as "Feeding" and "Not feeding" is also carried on the spindle 28 and is adapted to indicate the condition of the chute mechanism.

The handle 31 controls the shaft 28 which has a square portion to receive a stop 34, and after passing through a bearing 36 has a lever 34$^a$ secured to its remote end. A spring peg 34$^b$ is fixed in the lever 34$^a$ for the connection of a spring 37.

Figures 5$^a$ and 5$^b$ show the stop lever in the "not feeding" position and in contact with the uppermost arm 24$^c$ of the four armed lever 34 thus preventing the spring 26 from rocking said lever.

The spring 37 is secured to the bracket 30 at one end and at the other end to peg 34$^b$ carried by lever 34$^a$ which latter lever is in the form of a small overhung crank so that the spring 37 has a moment about the center of the shaft 28 and so tends to keep the shaft stationary in either of its two positions. A dog 34$^c$ located on the feed bar is designed so that at the end of its rearward stroke it comes into contact with the roller 25 carried by the lower arm 24$^a$ when the stop lever 34 is in the "feeding" position by this means operating the releasing fingers 27, 27$^a$ which release the tins from the chute. To arrest this motion the handle 31 is turned over through 180 degrees back within the "not feeding" position. This connection brings this stop lever 34 again in contact with lever arm 24$^c$.

With mechanism as above constructed the method of adjustment for a receptacle of the smaller dimensions referred to above is as follows: The lateral members 7, 7$^a$ are adjusted on the channelled guides 4, 4$^a$ until the space between said guides and the end members 10, 10$^a$ is sufficient to allow the body and lid to slide up and down freely therein. This adjustment moves the rock shafts 13, 13$^a$ carried by the said members 10, 10$^a$ and consequently the central guides 14, 14$^a$ on said shafts are caused to slide in their grooves 16 thereby ensuring that the relation between said central guides corresponds to that between the channelled guides and the end members.

The adjustment so far effected provides for the depth of the body and lid and the next step is to adjust the end members 10, 10$^a$ in relation to the lateral members 7, 7$^a$ and the central guide brackets 15, 15$^a$ on the channelled guides 4, 4$^a$ until the body and lid as regards their longitudinal dimensions make a sliding fit between said central guides 14, 14$^a$ and the end members 10, 10$^a$. The latter may be provided with graduations, which when used in conjunction with zero or like indications on the lateral members 7, 7$^a$ ensure that in setting said end members 10, 10$^a$ the distance from the centre between the bodies and lids is kept constant.

The releasing fingers 27, 27$^a$ are now set centrally between the end members 10, 10$^a$ and the central guides 14, 14$^a$ and all the parts are secured in the positions of adjustment given to them by the bolts, studs, nuts, etc., above mentioned. A body $x$ and lid $x^1$ are now placed in their respective channelled guides 4, 4$^a$ and the bell-crank lever 24 is set by the handle 31 into a position to allow the inside upper face of the body and lid to rest upon the lower arms of the releasing fingers 27, 27$^a$ as indicated in Fig. 5, whereupon the height of the channelled guides 4, 4$^a$ is adjusted on the main chute members 1 and 2 by screws 33 provided for the purpose, until the lower faces or edges of the bodies and lids clear the feed members 35, 35$^a$ previously mentioned by which they are ultimately conveyed to the dies and punches. The said main chute members 1 and 2 are now set on the sub-press or bed $d$ in such position, that when the bodies and lids drop from their suspended positions on the releasing fingers, they are in alignment with the guides at the proper distances separating the dies from one another as hereinafter explained. The link 20 connecting the levers 19, 19$^a$ on the horizontal rock shafts 13, 13$^a$ is now adjusted as to length in lever 19$^a$ until the relative positions of the releasing fingers 27, 27$^a$ for both bodies and lids are identical and then the operating handle 31 is moved to "not feeding" position and the bell-crank 24 locked by device 34. Bodies and lids are then placed in their respective channelled guides 4, 4$^a$ and the angular position of the releasing fingers 27, 27$^a$ on the rock shafts 13, 13$^a$ adjusted until a body and lid rest on the upper arms of the releasing fingers, which operation is performed by disengaging the toothed quadrant 21 from its rack 22, this permitting the releasing fingers 27, 27$^a$ to be brought to desired position, whereupon the quadrant is again engaged with the rack and locked in position.

The chute is now in a condition to deliver the bodies and lids to the feed members 35, 35ª which feed them to the dies. On one of said feed members is positioned an actuating finger or abutment (not shown) adapted to strike the roller 25 carried by the bell-crank 24, and thereby, through the described connections to the rack 22 and quadrant 21, operate the releasing fingers, 27, 27ª.

From the foregoing it will be seen that the bodies and lids are released to the feed members 35, 35ª at the correct time to ensure proper feeding of said parts to the dies and all that is necessary to stop or arrest the delivery is to move the operating handle 31 to "not feeding" position whereupon the locking device 34 engages the bell-crank 24 and thereby keeps the roller 25 thereon from engagement with the aforesaid actuating finger or abutment on the feed member.

When it is desired to deal with bodies and lids having a length between the minimum and maximum above mentioned it is necessary to remove the central guides 14, 14ª and their brackets 15, 15ª then bring the releasing fingers 27, 27ª to a central position between the end members 10, 10ª and adjust the parts as before to the required positions according to the size of receptacle.

In order that the location of the body and lid feeding chutes and associated parts above described may clear or not interfere with the general arrangement of the framing and the upper die head $c$ and its guiding means $c^1$ said chutes are placed at a sufficient distance from the first die position I, Iª for instance as aforesaid the line $z$. Figs. 1 and 2, designates the centre line of the chutes. There is thus entailed a certain amount of idle movement of the bodies and lids between the position at which they are delivered from the chutes to the feed-members 35, 35ª and said first die position and to provide for this idle movement, there is furnished suitable guiding means, which include adjustable plates to compensate for adjustments of the chute in dealing with receptacles of different depths and other adjustable means for receptacles of different widths and again driving fingers or abutments 35ᵇ, hereinafter described, on the feed-members 35, 35ª are of different width or size for different sizes of bodies and lids to always ensure these parts coming to proper position in relation to the dies or punches, whatever the adjustments which have been made to the feed chute mechanisms.

Such idle movement devices are illustrated in Figs. 6 to 8 of the drawings, the guiding means referred to forming separate races for the lids and bodies which are substantially identical except as to size so that a description of one thereof will suffice. To the front and rear push-pad frames $e$ there is adjustably attached by screws 36ª passing through slots 37ª a bracket 38 and attached to the forward end of the latter by screws 39 is a vertical plate 40 forming one wall of the race the other wall of which is formed by another vertical plate 41 bent rectangularly at the top and there adjustably secured to the bracket 38 by screws 42 passing through slots 43. This is as regards the body side but on the lid side adjustment between the plates 40 and 41 need not of necessity take place as the depth of the lids seldom varies. By the adjustable mounting of the plate 41 on the body side the width of the race can however be adjusted to accommodate bodies of varying depth. There are also provided in each race light springs 44 which bear on the backs of the bodies and lids as they are fed into the races by the fingers 35ᵇ on the feed bars 35, 35ª said springs maintaining the bodies and lids vertical and to prevent riding up of said bodies and lids within the races there are mounted on the plate 41 light spring members 45, these being vertically adjustable on the plate by means of screws 45ª passing through slots 45ᵇ to provide for bodies and lids of varying width (height as regards their position in Fig. 8). The entrance ends of either or both of the race plates 40 and 41 may be outwardly flared as shown at 40ª and 41ª in Fig. 7 to facilitate the entrance of the bodies and lids to the races.

It may here be stated that the fingers 35ᵇ (Fig. 8) are adjustably mounted on the feed-members 35, 35ª by being attached by screws 46 to blocks 47 which work in undercut grooves 48 in said members, the feed-members themselves sliding in grooves 35ᶜ formed in the sub-press, and it will be understood that during the forward reciprocation of said members the fingers thereon will transfer the bodies and lids from the positions at which they are delivered from the feed chutes previously described through the idle movement races wherein they are designated by $x$ and $y$ respectively to the positions shown at $x^1$ $y^1$, in broken lines in Fig. 7 in front of the front and rear push pads 54 to be hereinafter described in detail, and on the return or rearward movement of said feed-members 35, 35ª the races will side track any bodies and lids which may be therein out of the way to clear a space for said feed members and their fingers 35ᵇ, this being effected simultaneously with the forcing of the bodies and lids on to the lower dies Iª, IIª, IIIª by said push pads, for the reason that said races are attached to the push pad frames e as previously mentioned and move inward and outward therewith.

Fig. 7 also shows diagrammatically the arrangement of the lower dies at first position when simultaneously operating on the bodies and lids for two boxes, the push pads 54 being in positions in which they are about to force the bodies and lids onto said dies.

Figs. 9 and 10 show the push-pad and ejector mechanism in greater detail in cross section and on reference to these figures it will be seen that the feed members 35, 35$^a$ work on wearing plates 35$^d$ in the grooves 35$^c$ in the sub-press and adjacent said members are platforms 49 let into the grooves 35$^c$ and carried by stems 49$^a$ mounted on a cross-head 50 fastened by nuts 50$^a$ to a vertical rod 51 secured in the base of the sub-press. A spring 52 is interposed between the base and nuts 52$^a$ on said rod. The purpose of said platforms is to slightly lift the bodies and lids on the lower dies at certain times, and for the purpose explained in the specification of Letters Patent No. 1311587 aforesaid, the rod 51 co-operates with a rod 53 adjustably fitted in a boss 53$^a$ secured to a block 53$^b$ on the underside of the die head c.

The push-pads 54 and ejectors 55 must be mounted on their frames e in such a manner that they can be adjusted laterally to deal with boxes and lids of different depth. For this purpose there are provided on the bed of the sub-press L-shaped brackets 56 adjustably mounted by screws 57 passing through slots 58 in said plates. These brackets form raceways between themselves and the lower dies for the bodies and lids and are provided at their upper ends with blocks or bars 59 to fit over the bodies and lids and dies, over the lower dies when said bodies and lids are pushed thereover, said blocks being suitably adjustable as to height on the brackets to provide for boxes of different width, as by a bolt and slot connection 59$^a$, Figures 9 and 10. The said blocks or bars 59 prevent riding up of the bodies and lids during the punching operation and also during final discharge from the last die position where they are also preferably provided. The push-pads 54, which work through apertures in said brackets, are mounted in blocks 60, being loosely carried by adjustable rods 61 and having a slight extent of sliding movement which is buffered by a spring 62$^a$ so that the bodies and lids are forced onto the lower dies, with resilient pressure. The blocks 60 have rearward extensions forming part of the push-pad frame e and which are adjustably connected by threaded links 62 and nuts 63 to operating levers 64 and 65 hereinafter mentioned. The ejectors 55 which are provided with depending fingers 55$^a$ fitting between the dies for removing the bodies and lids therefrom after they have been acted on by the upper punches, are adjustably mounted on angular extensions 66 of the blocks 60, there being two of said ejectors for each body and lid, one at each end and adapted to operate centrally between adjacent dies. The adjustment given to the ejectors by this method of mounting may be of a slight character and is provided in addition to the adjustment of the brackets 56, being effected by screws 67 passing through slots 68 in the ejectors, the latter being held in adjusted position by other screws 69 bearing against the rear faces of the extensions 66. When dealing with two boxes of minimum size an additional central ejector is provided between them acting on adjacent sides of both boxes of a pair as shown at position II$^a$, Fig. 2. This additional ejector, which is mounted on the same push-pad block 60 as the two ordinary ejectors, is omitted in other cases. The lower ends of the ejector fingers 55$^a$ may be provided with transverse plates or blocks 55$^b$ of different sizes to bridge the spaces between the dies according to whether one or two boxes are being dealt with. Thus it will be seen in Fig. 2 (central die position II$^a$) the plate 55$^b$ of the additional ejector will be relatively small owing to the short distance between the double dies whilst between this position and that to right and left respectively (die positions I$^a$ and III$^a$) the ejectors themselves and their plates 55$^b$ are longer to fill the wider spaces between the dies.

Of the operating levers 64 and 65 above referred to, one lever 64 is single armed and provided on the body side of the sub-press, being fulcrumed at 70 on a bracket 71. The other lever 65 is on the lid side of the sub-press and is fulcrumed at 72 in a bracket 73. This lever is double-armed and its lower arm has an antifriction roller 74 engaging a race 75 in a box cam 76 carried by the main cam shaft f of the machine. The two levers are connected together by a rod 77 the connection to levers 65 at 77$^a$ being an adjustable one.

With such a construction as above described the method of lateral adjustment of the push pads and ejectors for dealing with boxes of different sizes is as follows:—

The original adjustment to fix the initial position of the push pads and ejectors is effected by the threaded links 62 and nuts 63, but to vary the strokes for bodies of different depth, the throw of the operating lever 64 is altered by moving the point of connection 77$^a$ of the rod 77 to or away from the fulcrum 72 of the lever 65. As the lids vary only slightly in depth as previously mentioned a constant stroke may be given to the push pads and ejectors on this side and any differences compensated for by the spring buffer 62ª.

As regards longitudinal adjustment, the feed fingers 35ᵇ before referred to are made in two parts so that they can be separated or brought together according to the space at disposal due to the longitudinal dimensions of the bodies and lids. The said fingers are always adjusted on the feed members or bars 35, 35ª to or away from a position which coincides with the die centres so as to fill up the vacant space between the box members according to their sizes. The longitudinal stroke of the feed members 35, 35ª is always constant and the different dies provided for varying sizes of boxes always have their centres at the same position longitudinally of the press, the aforesaid adjustability of the fingers 35ᵇ permitting this to be effected.

As regards vertical adjustment it will be understood that the stroke of the die head c is constant for all sizes of boxes and the depth of the upper dies or punches is chosen according to the size of the lower dies so that such constant stroke may always be maintained.

A further feature of the invention comprises novel mechanism at the delivery or assembly end of the machine (position III and IIIª Figs. 1 and 2 respectively) whereby when dealing with two bodies and lids at a time, or with bodies and lids of different sizes, as previously mentioned, the lids may be properly applied to or assembled with the bodies always at a predetermined and constant position.

This feature of the invention is more particularly illustrated in Figs. 11 to 13 of the drawings from which it will be seen that for assembling the lids of two receptacles at a time there are provided two lid holders 80 and 81, arranged in tandem. These lid holders are both carried on a throwover arm or lever 82, the first holder being mounted on said arm in a stationary manner, that is to say, it has no movement in relation thereto in a longitudinal direction of the machine. Each holder comprises a block to receive a lid y (Fig. 11) forwarded by the feed fingers 35ᵇ from the previous die position, such block being carried by rods 83 in the head 84 of a hollow bearing member 85 carried by a plate 93 which is adjustably mounted on the throwover arm 82 as regards vertical movement by slot and screw connection 94. Within said member 85 is housed a spring 86 bearing on a stem 87 attached to the block so that the latter exerts resilient pressure when the lid is brought into engagement with the body as hereinafter explained. The second lid holder is similarly mounted in its bearing member 85, but the latter is supported on a slide 88 adapted for movement on the plate 93 longitudinally of the machine and there is interposed between the two holders a spring 89 which tends to maintain a roller 90 on an extension 91 of said second lid holder in engagement with a cam 92 adjustably mounted in the bed of the sub-press for a purpose hereinafter described. The lids are held on the holders 80 and 81 by means of a light spring finger 95 which also prevents over running of said lids as they arrive from the previous die position.

The said throwover arm 82 is of the curved shape shown in Fig. 11 and is fulcrumed at 82ª in a bracket 96 depending from the bed of the sub-press and adjacent said fulcrum is provided with an extension 97 provided with a slot 98 in which works a block 99 under the action of an adjusting screw 99ª to vary the position of the block in the slot. To said block is pivoted one end of a connecting rod 100 the other end of which is pivoted to a lever 101 fulcrumed at 102 to a bracket 103 and acted on by a cam 104 on the main cam-shaft f of the machine. The cam 104 tends through the connections described, to throw the arm 82 with the lids on the holders 80 and 81, over to the position of assembling with the bodies which have been forced by the push pads on to the assembly body dies as shown in broken lines at x, Fig. 11. The hinging operation between the body and lid by means of the upper punches takes place at point x², the lid being maintained in a sloping position by reason of the inclined face 105 of the body die IIIª against which the lids are brought by the rocking movement of the throw-over arm 82, after which operation the arm is returned to normal position by means of springs 106. This return motion takes place after the upper punches have moved upwards, and during this upward movement ejectors, operating as previously described, remove the assembled body and lid from the dies IIIª during which movement the lid flies open allowing the holder or holders 80, 81 with spring finger 95 to return to normal position with the arm 82 ready to receive another lid or lids as the case may be.

For bodies and lids of different sizes, whether a single one or two of each are being dealt with, various adjustments are obviously necessary and in the case of variation for different depths the point at which the hinging operation between the body and lid takes place varies in a vertical direction and the lid holder must always return to an exactly vertical position to receive a new lid. The angle of movement of the throw-over arm 82 from its fulcrum 82ª to the point of hinging therefore varies and consequently with the use of but a single cam 104 (which it is intended shall always remain for operating the arm 82) some form of compensating adjustment is necessary. This is effected by varying the position of the block 99 in the slot 98 of the arm extension 97 so that the effective throw of the arm 82 is varied whereby all differences in the sizes of the boxes can be provided for.

For dealing with different heights of lids when assembling, the lid holder is adjusted as to height on the arm 82 by means of the slot and screw connection 94 so that it may be properly centered with respect to the body on the assembling die III$^a$. The body die is obviously changed for different sizes of boxes and consequently the point of connection of the hinge varies along a vertical line as aforesaid. The angle 105 at which the assembling of body and lid takes place is immaterial as long as these two parts are brought into proper relative positions for the upper punches to act thereon.

The position of the bottom of the body on its die is constant relatively to the position of the lid so that whatever the size of the receptacle the assembling of the body and lid will always be properly effected.

In the case of two lid holders, as illustrated in the drawings, the first lid of the pair arrives opposite the first holder 80 under the action of the feed fingers 35$^b$ and is forced by the following lid on to the second holder 81, said two holders being in contact with one another as illustrated in Fig. 13 this position being maintained by the roller 90 engaging the flat portion of the cam 92. As the throw-over arm 82 carries out its movement the second holder 81 will slide away from the first under the action of the spring 89 and is guided by the inclined portion of the cam 92, until the centre of said holder is brought exactly opposite the centre of the second body on its assembling die. The roller can be caused to leave the cam at any position according to bodies of different size by limiting the sliding movement of the second lid holder as by means of a screw on its slide.

In the case of two lid holders there is also provided on the body side of the press a guide 107 formed of resilient tongues mounted on a stationary arm 108 carried by a bracket 109, this guide being engaged by the lids as they are moved over by the arm 82 to ensure them being fed accurately to the bodies in the event of the cam action of the second lid holder 81 not being quite correct.

For dealing with bodies and lids of the maximum size equivalent to two such members of the smallest size, the lid holder supports are fixed in relation to one another and carry a single holder and a single body die of the required size is substituted for the two body dies previously used.

After the bodies and lids have been assembled and withdrawn from the assembling die or dies by the ejectors, the finished receptacles arrive in a raceway 110 (Fig. 2) formed between a bar 111 having a curved inlet 112 and a flange or bar 113 formed on or supported by the sub-press being fed to and carried through said raceway by other fingers 35$^b$ on the feed members 35 past a light spring 114 which closes the lid or lids, and finally discharges them from the machine at the opposite end of said raceway.

It will be obvious that for different sizes of receptacles the die and punches must be changed and the machine is constructed in such a manner that the frames or supports for said dies and punches can be separately and (or) simultaneously adjusted or withdrawn to one side of the machine to render these parts accessible for the desired changes, this being suitably accomplished by similar means to those described in specification of Letters Patent 1311587 it may be remarked however that whatever the size of receptacles dealt with the stroke of the upper punches is constant and the distances between the centres of the respective dies always remains constant, all adjustments taking place in both directions from said centres or from the equivalents thereof at the feed delivery and other positions.

What I claim as my invention and desire to secure by Letters Patent of the United States is:—

1. In mechanism for the purpose hereinbefore set forth, means whereby a plurality of complete receptacles may be simultaneously produced at a single operation.

2. In mechanism for the purpose hereinbefore set forth, means whereby a plurality of complete receptacles may be simultaneously produced at a single operation, and adjustable means whereby the mechanism may be readily converted for producing either a plurality of receptacles or a single receptacle at a single operation.

3. In mechanism for the purpose hereinbefore set forth, means whereby a plurality of complete receptacles may be simultaneously produced at a single operation, and means whereby receptacles of different sizes within limits prescribed by maximum and minimum dimensions of associated dies may be simultaneously produced either singly or in pairs or numbers.

4. In mechanism for the purpose hereinbefore set forth, the combination of devices for feeding bodies and blanks for the receptacles co-operating dies and punches for shaping said blanks, means for assembling the shaped bodies and lids, and means for adjusting the feeding, shaping and assembling elements whereby single or multiple receptacles may be produced at each operation the adjustments being effected in both directions from positions corresponding to the centres of said dies and punches which are at invariable distances apart.

5. In mechanism for the purpose hereinbefore set forth, the combination with dies for shaping bodies and lids for the receptacles, of separate feeding devices for said bodies and lids comprising oppositely disposed chutes each formed of members relatively adjustable to provide for differences of height, depth and length of bodies and lids and also adapted to accommoate a plurality of said bodies and lids at will, and means for temporarily arresting said bodies and lids in the chutes and for subsequently releasing them for passage to the said dies.

6. In mechanism for the purpose hereinbefore set forth, the combination with dies for shaping bodies and lids for the receptacles, of separate feeding devices for said bodies and lids comprising oppositely disposed chutes each formed of members relatively adjustable to provide for differences of height, depth and length of bodies and lids and also adapted to accommodate a plurality of said bodies and lids at will, means for temporarily arresting said bodies and lids in the chutes and for subsequently releasing them for passage to the said dies, a manually operated device for controlling the operation of the arresting and releasing means for single or multiple receptacles and means for indicating the active and inoperative positions of said manually operated device.

7. In mechanism for the purpose hereinbefore set forth, the combination with means for feeding bodies and lids for the receptacles, means for subsequently shaping said bodies and lids and means for transferring same from the feeding means to the shaping means, of an "idle-motion" mechanism disposed between the feeding and shaping means for receiving said bodies and lids prior to being acted on at the initial shaping position, said idle-motion mechanism comprising raceways movable towards and away from each other with parts of the shaping means and adapted to side track said bodies and lids to clear said transfer means.

8. In mechanism for the purpose hereinbefore set forth, the combination with means for feeding bodies and lids for the receptacles, means for subsequently shaping said bodies and lids and means for transferring same from the feeding means to the shaping means, of an "idle-motion" mechanism disposed between the feeding and shaping means for receiving said bodies and lids prior to being acted on at the initial shaping position, said idle-motion mechanism comprising raceways movable toward and away from each other with parts of the shaping means and adapted to side track said bodies and lids to clear said transfer means, said raceways comprising spaced elements certain of which are relatively adjustable to accommodate bodies of different sizes, and resilient means for retaining the bodies and lids within the raceways between operations of the transfer means.

9. In mechanism for the purpose hereinbefore set forth, the combination with means for feeding bodies and lids for the receptacles and means for subsequently shaping said bodies and lids, of means for transferring the bodies and lids from said feeding means to the shaping means, said transfer means comprising members adjustably mounted on reciprocating feed elements and formed of relatively adjustable portions in order that they may be variably positioned on said elements to transfer bodies and lids for different sized receptacles or bodies and lids for single or multiple receptacles at will.

10. In mechanism for the purpose hereinbefore set forth, the combination with dies to receive bodies and lids for shaping purposes, of push members for placing said bodies and lids on the lower dies and ejectors for removing them therefrom after shaping, and means for varying the stroke of said push members and ejectors according to different sizes of receptacles.

11. In mechanism for the purpose hereinbefore set forth, the combination with dies to receive bodies and lids for shaping purposes, of push members for placing said bodies and lids on the lower dies and ejectors for removing them therefrom after shaping, means for varying the stroke of said push members and ejectors according to different sizes of receptacles, adjustable elements on the push elements for retaining different sized receptacles in position and for positioning the same on the dies, and exchangeable elements on the ejectors to provide for differing spaces between adjacent dies according to the size and number of receptacles being dealt with.

12. In mechanism for the purpose hereinbefore specified, the combination with means for shaping bodies and lids for the receptacles, of means for assembling said shaped bodies and lids comprising a single throw-over member for conveying the lids into proper assembling position with relation to the bodies, a lid holder adjustably mounted on said throw-over member, a cam of constant throw, and adjustable means operated by said cam for varying the point of assembling position according to the size of the receptacle.

13. In mechanism for the purpose hereinbefore specified, the combination with means for shaping bodies and lids for the receptacles, of means for assembling said shaped bodies and lids comprising a single throw-over member for conveying the lids into proper assembling position with relation to the bodies, separate lid holders mounted on said throw-over member for assembling a plurality of receptacles simultaneously, said lid holders being normally in juxta-position to receive the lids in close succession, and means for relatively moving said lid holders to bring individual lids opposite the associated spaced bodies for assembly therewith.

14. In mechanism for the purpose hereinbefore specified, the combination with means for shaping bodies and lids for the receptacles, of means for assembling said shaped bodies and lids comprising a single throw-over member for conveying the lids into proper assembling position with relation to the bodies, separate lid holders mounted on said throw-over member for assembling a plurality of receptacles simultaneously, said lid holders being normally in juxta-position to receive the lids in close succession, means for relatively moving said lid holders to bring individual lids opposite the associated spaced bodies for assembly therewith, one of said lid holders being slidably mounted on the throw-over member, a stationary cam, and a spring adapted to force the lid holder in contact with said cam whereby as said throw-over member operates the cam positions the lid with regard to its respective body.

15. In mechanism for the production of sheet metal receptacles with a wireless hinged joint between the body and lid, the combination of adjustable means for feeding bodies and lids, means for shaping said bodies and lids adjustably mounted and operated push members and ejectors for use with said shaping means, and adjustably constructed and operated means for assembling the shaped bodies and lids for the purpose of adapting the mechanism for receptacles of different sizes and for simultaneously dealing with single or multiple receptacles.

16. In mechanism for the purpose specified, the combination of means for feeding blanks, co-operating dies and punches for shaping said blanks, means for assembling the shaped blanks to hingedly connect the same, and means for adjusting the feeding, shaping and assembling elements whereby single or multiple receptacles may be produced at each operation.

In witness whereof I have signed this specification.

GEORGE WILLIAM BERRY.